B. A. KARR.
PNEUMATIC TIRE.
APPLICATION FILED SEPT. 25, 1919.

1,339,516.

Patented May 11, 1920.

INVENTOR.
Burton A. Karr
BY
ATTORNEYS

UNITED STATES PATENT OFFICE.

BURTON A. KARR, OF LOS ANGELES, CALIFORNIA.

PNEUMATIC TIRE.

1,339,516.  Specification of Letters Patent.  Patented May 11, 1920.

Application filed September 25, 1919. Serial No. 326,312.

*To all whom it may concern:*

Be it known that I, BURTON A. KARR, a citizen of the United States, residing at Los Angeles, in the county of Los Angeles and State of California, have invented new and useful Improvements in Pneumatic Tires, of which the following is a specification.

My invention relates to pneumatic tires and consists of the novel features herein shown, described and claimed.

My object is to make a pneumatic tire without the use of the usual inner tube and which cannot be punctured and deflated by nails and the like.

Figure 1:
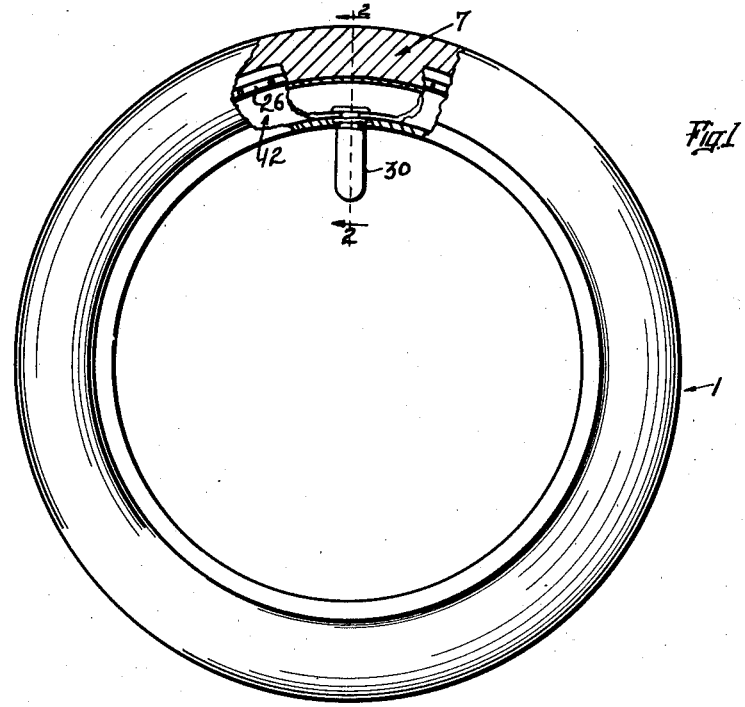
Figure 1 is a side elevation of a pneumatic tire embodying the principles of my invention, parts being broken away and shown in section.
Figure 2:
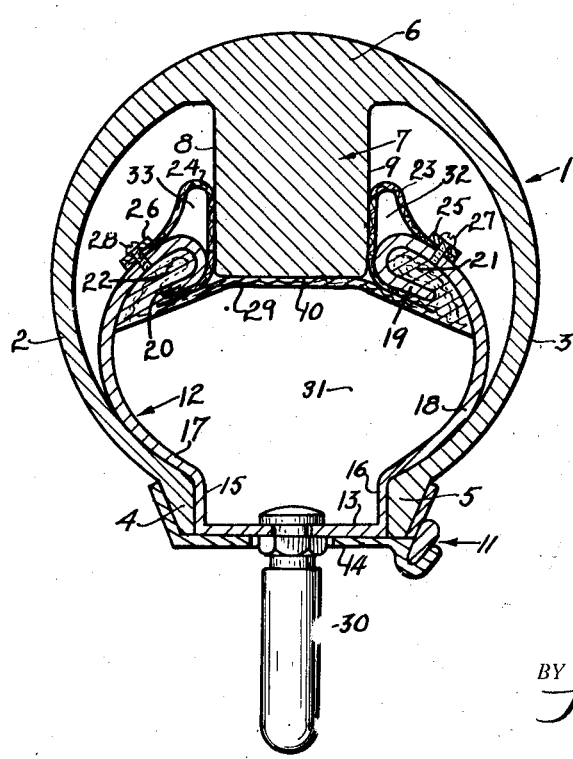
Fig. 2 is a cross sectional detail on the line 2—2 of Fig. 1 and looking in the direction indicated by the arrows.

The pneumatic tire casing 1 may have any desired form of side walls 2 and 3 and any desired form of rim beads 4 and 5 and the tread 6 may be non-skid or smooth and constructed in any of the usual ways.

The essential feature of the casing 1 is the reinforcement 7. The reinforcement 7 is located directly in line with the central portion of the tread 6 and has straight sides 8 and 9 and a straight inner face 10 at right angles to the sides 8 and 9 concentric to the axis. The center of the face 10 is substantially at the cross sectional center of the casing 1. The beads 4 and 5 fit upon a quick detachable rim 11.

The metal casing 12 consists of a flat annular rim portion 13 fitting the body 14 of the quick detachable rim, the bead wall portions 15 and 16 extending straight out from the edges of the portion 13 against the inner faces of the beads 4 and 5, the side wall portions 17 and 18 extending outwardly from the outer edges of the portions 15 and 16 and fitting the inner faces of the side walls 2 and 3 for some distance and then curving inwardly from the side walls, and the clencher portions 19 and 20 at the outer edges of the side wall portions 17 and 18.

The inner beads 21 and 22 fit within the clencher portions 19 and 20. The tire fabrics 23 and 24 extend from the inner beads 21 and 22 inside of the clencher portions 19 and 20 outwardly along side of the faces 8 and 9 and outwardly and backwardly and bear upon the outer parts of the side wall portions 17 and 18. Annular rings 25 and 26 fit against the outer edges of the fabrics 23 and 24 and screws 27 and 28 are inserted through the rings 25 and 26 and tapped into the side wall portions 17 and 18. The reinforcement 7 fits closely between the fabrics 23 and 24 at points between the clencher portions 19 and 20. A tire fabric 29 connects the inner beads 21 and 22 normally straight across and fits against the face 10 of the reinforcement 7.

The tire valve 30 is fixed through the quick detachable rim band 14 and through the annular rim portion 13 and connects with the compressed air chamber 31 formed by the casing 12 and fabric 29. The tension of the compressed air presses the fabric 29 outwardly against the reinforcement 7 thereby pressing the tread portion 6 outwardly. If air leaks from the chamber 31 it will pass into the chambers 32 and 33 formed by the fabrics 23 and 24.

As the wheel operates the reinforcement 7 will reciprocate radially and press the fabric 29 inwardly and the compressed air will press the fabric 29 outwardly.

Thus I have produced a pneumatic tire comprising a tire casing having rim beads, side walls and a tread, and a reinforcement extending inwardly from the tread, said reinforcement having straight sides and a flat inner face; a metal casing adapted to fit the tire rim and having bead walls extending outwardly inside of the beads and side walls extending outwardly inside of the side walls of the tire casing, and clencher portions extending outwardly from the side wall portions; fabric beads in the clencher portions; fabrics extending from the fabric beads outwardly around between the clencher portions and having their outer edges secured to the side wall portions; and a fabric connecting the beads straight across and engaging the reinforcement and forming a compressed air chamber within the metallic casing and last named fabric, the pressure of the compressed air being exerted to press the fabric against the reinforcement.

Various changes may be made without departing from the spirit of my invention as claimed.

I claim:

1. A pneumatic tire comprising a tire casing having rim beads, side walls, a tread and a reinforcement extending inwardly from the tread; said reinforcement having straight sides and a flat inner face; a metal casing adapted to fit the tire rim and having bead walls extending outwardly inside of the beads and side walls extending outwardly inside of the side walls of the tire casing, and clencher portions extending outwardly from the side wall portions; fabric beads in the clencher portions; fabrics extending from the fabric beads outwardly around between the clencher portions and having their outer edges secured to the side wall portions; and a fabric connecting the beads straight across and engaging the reinforcement and forming a compressed air chamber within the metallic casing and last named fabric, the pressure of the compressed air being exerted to press the fabric against the reinforcement.

2. In a pneumatic tire, a fabric tire casing having rim beads, side walls and a tread, a reinforcement extending inwardly from the tread, a metallic casing fitting between the rim beads and the side walls and forming a compressed air chamber, the reinforcement sliding into the compressed air chamber, and flexible means connected across the metallic casing against the reinforcement to hold the compressed air.

In testimony whereof I have signed my name to this specification.

BURTON A. KARR.